Patented Aug. 31, 1937

2,091,610

UNITED STATES PATENT OFFICE 2,091,610

REFRACTORY PRODUCTS AND PREPARATION OF SAME

Walter W. Patnoe, Maple Grove, Ohio, assignor to Basic Dolomite, Inc., Cleveland, Ohio, a corporation of Ohio No Drawing. Application July 8, 1933, Serial No. 679,582

13 Claims. (Cl. 106—9)

Dolomite refractory material in clinker form, as employed for furnace linings, etc., is under the handicap of being freely exposed to the atmosphere in handling prior to its final bedding in place. There is accordingly a detrimental result on any components of susceptible character, as for example a tendency to deteriorative air-slacking in a dolomite refractory; to say nothing also of the irritating dust to which the workmen are more or less subjected. It is among the objects of the present invention to provide dolomite refractory material in a form protected during preliminary handling and exposure and capable of convenient application in forming furnace linings, etc. Other objects and advantages will appear as the description proceeds.

To the accomplishment of the foregoing and related ends, the invention, then, comprises the features hereinafter fully described, and particularly pointed out in the claims, the following description setting forth in detail an illustrative embodiment of the invention, this being indicative however, of but one of the various ways in which the principle of the invention may be employed.

The raw material, such for instance as dolomite, is crushed and screened to the desired size. This will depend somewhat upon the particular conditions in view, some usages requiring a coarser grain and some a finer grain. For example, the dolomite is graded so that each piece will pass a ½ inch opening, and essentially all be retained on a 20 mesh screen. Fluxing ingredients are admixed, and for the purposes of the present description it is sufficient to state that such may be of iron, or other material as desired; for instance mill scale to the extent of 1½–6 per cent. The flux-mixed dolomite is fired under suitable conditions, for instance in a rotary kiln, and at a temperature to satisfactorily incorporate the flux, and which temperature may range about 2700 to 3000° F. The burned clinker, discharged from the kiln, and sufficiently cooled, is now provided with a light coating of protective character. This may be an oil, by which it is meant to include equivalent protective substances, tars, asphalts, etc., which can protect without being of any ultimate detriment to the refractory in operation. For instance, a mineral oil, and preferably a residual oil such as a black oil of 20° Bé. gravity may be employed, this being lightly sprayed upon the dolomite clinker as it is suitably agitated and stirred to spread the coating about upon the surfaces of the particles. An application of oil or the like at the rate of ⅛ to ½ gallon per ton of clinker is sufficient, and after suitable stirring and admixture are accomplished, the particles each presents a very thin film or coat of the protective oil, inhibiting access of the atmosphere. Correspondingly, such clinker although in free exposure, is protected against air-slacking tendency. Additionally also, in unloading or handling generally, dust is inhibited and there is thus an avoidance of the handicap on workers, besides an avoidance of dust thrown against the walls of the furnace and being carried off into the checker chambers to there come in contact with acid refractories with detrimental results at high temperatures.

Other modes of applying the principle of the invention may be employed, change being made as regards the details described, provided the features stated in any of the following claims, or the equivalent of such, be employed.

I therefore particularly point out and distinctly claim as my invention:

1. A process of preparing free flowing, comminuted, granular refractory materials, which comprises burning dolomite and the like to clinker, cooling same and subsequently coating the surfaces of the clinker particles with a mineral oil, the amount of oil being such that the free flowing granular condition of the clinker is preserved, and the air slacking tendency is counteracted.

2. A process of preparing free flowing, comminuted, granular refractory materials, which comprises burning dolomite and the like to clinker, cooling same and subsequently coating the surfaces of the clinker particles with a residual petroleum oil, the amount of oil being such that the free flowing granular condition of the clinker is preserved, and the air slacking tendency is counteracted.

3. Unagglomerated refractory material comprising dolomite clinker unhydrated and having its discrete particles surfaced with a mineral oil preserving the granular free flowing character of the original clinker.

4. Unagglomerated refractory material comprising dolomite clinker unhydrated and having its discrete particles surfaced with a residual petroleum oil preserving the granular free flowing character of the original clinker.

5. Unagglomerated refractory material comprising dolomite clinker unhydrated and having its discrete particles surfaced with a fraction of one percent of mineral oil.

6. Unagglomerated refractory material comprising dolomite clinker unhydrated and having its discrete particles surfaced with a fraction of one percent of residual petroleum oil.

7. A process according to claim 1 wherein a fraction of one percent of mineral oil is used.

8. A process according to claim 2 wherein a fraction of one percent of residual petroleum oil is used.

9. Refractory material comprising discrete unhydrated particles of dolomite which has been calcined at 2700° to 3000° F., said particles having their fracture-surfaces coated with a light film of mineral oil.

10. As a new article of manufacture, discrete unhydrated particles of a calcined lime base having their fracture-surfaces coated with an oil film preserving the free flowing character of the particles.

11. As a new article of manufacture, discrete unhydrated particles of a calcined lime base provided with iron oxide and coated with an organic protective film preserving the free flowing character of the particles.

12. As a new article of manufacture, discrete unhydrated particles of a calcined lime base provided with iron oxide and coated with an oil film preserving the free flowing character of the particles.

13. As a new article of manufacture, discrete unhydrated particles of calcined dolomite provided with iron oxide and coated with an oil film preserving the free flowing character of the particles.

WALTER W. PATNOE.